United States Patent
Joergensen et al.

(10) Patent No.: US 8,356,544 B2
(45) Date of Patent: Jan. 22, 2013

(54) RAISING DRIVE AND METHOD FOR CONTROLLING A RAISING DRIVE

(75) Inventors: Martin Raadkjaer Joergensen, Soenderborg (DK); Rudi Thomsen, Augustenborg (DK)

(73) Assignee: Sauer-Danfoss Aps, Nordborg (DK)

( * ) Notice: Subject to any disclaimer, the term of this patent is extended or adjusted under 35 U.S.C. 154(b) by 1182 days.

(21) Appl. No.: 12/187,475

(22) Filed: Aug. 7, 2008

(65) Prior Publication Data

US 2009/0045017 A1    Feb. 19, 2009

(30) Foreign Application Priority Data

Aug. 18, 2007  (DE) .......................... 10 2007 039 105

(51) Int. Cl.
*F15B 11/04* (2006.01)
(52) U.S. Cl. ........................................................ 91/433
(58) Field of Classification Search ................ 91/1, 433, 91/454

See application file for complete search history.

(56) References Cited

U.S. PATENT DOCUMENTS

| 4,518,044 | A | * | 5/1985 | Wiegardt et al. ................. 172/7 |
| 4,571,500 | A |   | 2/1986 | Mucheyer |
| 4,907,493 | A |   | 3/1990 | Bellanger et al. |
| 5,359,836 | A | * | 11/1994 | Zeuner et al. .............. 56/10.2 E |
| 5,684,691 | A |   | 11/1997 | Orbach et al. |

FOREIGN PATENT DOCUMENTS

EP    0414279 A2    2/1991

* cited by examiner

*Primary Examiner* — F. Daniel Lopez
(74) *Attorney, Agent, or Firm* — McCormick, Paulding & Huber LLP

(57) ABSTRACT

The invention concerns a method for controlling a raising drive, the raising process occurring by means of pressure activation of at least one lift cylinder and the lowering process occurring by means of relieving, and a control of the lowering speed occurring by means of a variable flow resistance. In order to achieve a load-independent lowering speed, the flow resistance is determined in dependence of at least one load signal.

38 Claims, 3 Drawing Sheets

RAISING DRIVE AND METHOD FOR CONTROLLING A RAISING DRIVE

CROSS REFERENCE TO RELATED APPLICATION

Applicant hereby claims foreign priority benefits under U.S.C. §119 from German Patent Application No. 10 2007 039 105.8 filed on Aug. 18, 2007, the contents of which are incorporated by reference herein.

FIELD OF THE INVENTION

The invention concerns a method for controlling a raising drive, the raising process occurring by means of pressure activation of at least one lift cylinder and the lowering process occurring by means of relieving, and a control of the lowering speed occurring by means of a variable flow resistance. Further, the invention concerns a raising drive having at least one single-actuated hydraulic cylinder, which is connected to a working pipe, the flow resistance of the working pipe being variable, and the raising drive having at least one load sensor.

BACKGROUND OF THE INVENTION

Raising drives are often used with driven machines and serve the purpose of fixing equipment. In connection with agricultural vehicles, for example tractors, the raising drives are also called tool bars. In agricultural equipment, for example, a plough, can be fixed and can be moved upwards and downwards by means of the raising drive. Also the vertical position of a piece of equipment is determined by the raising drive.

Usually, raising drives have at least one single-actuated hydraulic cylinder, which is connected to a control arrangement, the control depending on various measuring signals and instructions given by operators.

For example, a piece of equipment fixed on the raising drive is raised by means of a pressure activation of the hydraulic cylinder. The lowering then takes place by means of pressure relief of the hydraulic cylinder due to the effect of the gravity, the lowering speed depending on, for example, the mass of the equipment and frictional forces, if any. In order to limit the lowering speed, fixed or adjustable valves or throttles are inserted in a working pipe of the hydraulic cylinder, fluid flowing through said valves or throttles during the lowering.

Usually, it is desirable to maintain the position of the equipment. For example, with a soil treatment tool, a penetration depth of the tool specified by the driver is considered by the control. However, observing the prespecified penetration depth of the tool should not cause the tractor to bog down.

U.S. Pat. No. 4,518,044, for example, discloses a control, which, apart from the penetration depth of the tool specified by the driver, also considers the slip of the driving wheels, the speed of the motor, and the drag of the tool during the control. In this connection, the raising and lowering speeds are controlled in that with corresponding speed various desired positions are specified. The actual raising and lowering speeds are not measured in this connection.

This may particularly cause the lowering speed to deviate from the desired speed. With a light-weight tool, frictional forces may prevent the tool from following the prespecified desired positions during lowering, for example, the tool moves slower than anticipated. With a heavy-weight tool it may occur that the actual position is ahead of the desired position, meaning that the tool moves faster than intended.

With soil treatment tools there is an additional problem, namely that the effect of the gravity is substantially eliminated, when the tool gets in contact with the surface of the ground. Particularly with heavy-weight tools, the user will normally have partially closed the throttle or the valve in the working pipe, in order to limit the lowering speed. With a slow lowering speed and/or with light-weight tools it may, however, happen that the gravity is no longer sufficient to lower the tool into the ground against the frictional forces of the system and the forces of the soil acting against the gravity.

It is known for the user to solve this problem by increasing the lowering speed, that is, to further open the throttle or the valve in the working pipe, as soon as the tool hits the ground. This causes a further relief of the hydraulic cylinder, which again reduces the forces acting against the penetration of the tool into the ground.

It is also known to provide the control with a so-called fast penetration function, which makes it possible for the driver to activate a switch at the contact of the tool with the ground, after which the control, for example, opens a valve aperture to its maximum to completely relieve the hydraulic cylinder. Such solutions are, however, less comfortable, and may under certain circumstances distract the driver.

In order to achieve the same lowering speeds in connection with tools having different masses or weights, for example, U.S. Pat. No. 5,684,691 discloses the measuring of a parameter, which is proportional to the weight of the tool. In this connection, the weight of the tool is measured by weighing with still-standing vehicle and raised tool. Depending on the measured weight, the tools are then divided into categories. The specifications of desired raising and lowering speeds are then made in accordance with the individual categories. This solution has the disadvantages that the lowering speed is substantially reduced at the contact of the tool with the ground and that each change of tool requires a weighing process.

It is also known, for example from U.S. Pat. No. 4,571,500 and EP 0 414 279 A2, to determine the lowering speed and adapt the control correspondingly. Thus, the lowering speed can be controlled independently of the weight of the tool. The actual lowering speed is determined by differentiation of position signals. In connection with faulty position signals, malfunction may easily occur, the differentiation increasing the influence of such malfunctions. As the control of the lowering speed takes place in parallel to the control of the position of the tool, instabilities, such as, for example, oscillations may occur.

SUMMARY OF THE INVENTION

The invention is based on the task of providing a raising drive and a method for controlling a raising drive, with which a substantially load-independent lowering speed can be achieved and with which the disadvantages mentioned above do not occur.

This task is solved in accordance with the invention in that the flow resistance is determined depending on at least one load signal.

The flow resistance is, for example, influenced by a change of the flow cross-section. If the flow resistance is determined depending on a load signal, the lowering speed is determined simultaneously. Thus, the lowering speed can be kept constant, independently of the weight of the tool. If a contact between the tool and the ground occurs, this can be recognised by means of the load signal. Through an adaptation of the flow resistance, an automatic control, for example in the form of a reduction of the flow resistance, is possible in that the tool penetrates into the ground. The control of the flow resistance by means of the load signal can, however, be overridden by, for example, user specifications. This is, for example, the case, if the driver specifies a small lowering speed. With an overriding position control, the flow resistance ascertained depending on the load signal, for example, determines the smallest permissible flow resistance. As soon as the tool gets in contact with the ground, this is registered by means of the load signal, and a corresponding reduction of the flow resistance occurs automatically.

Preferably, a vertical load is calculated on the basis of the load signal. On the basis of the load signal a value is formed or, in certain cases, calculated, which substantially corresponds to the vertical load. The lowering speed of the tool is mainly influenced by the vertical load. If, now, the vertical load is available, this can be the basis of a simple control of the lowering speed, and the influence of other parameters can be ignored.

Preferably, an increase of the vertical load will increase the flow resistance, and a reduction of the vertical load will reduce the flow resistance. This, for example, occurs in that in connection with an increase of the vertical load, the flow cross-section is reduced, and in connection with a reduction of the vertical load the flow cross-section is increased. An increase of the flow resistance in connection with an increase of the vertical load will cause a smaller relief of the lift cylinder, which means that a larger force will be required to achieve the same lowering speed. This force is, for example, generated by a higher weight of the tool. A corresponding control will eliminate the effect of the higher weight by means of a corresponding increase of the flow resistance. This results in a load-independent control of the lowering speed.

Preferably, the load signal is generated by a force sensor, which serves the purpose of ascertaining a drag force. In traditional raising drives, such a force sensor is usually already available, as the drag force is an important parameter for determining the penetration depth of the tool or for detecting the risk of bogging down. If, now, the load signal is also generated by the force sensor, the method according to the invention can be used in a cost effective manner, as no additional sensor is required.

Preferably, the flow resistance is changed by a first valve arrangement. A valve arrangement can, for example, be formed by a valve element with a valve seat. Additionally, a throttle or an aperture can also be used. The valve arrangement is, for example, inserted in the outlet flow of the lift cylinder. These elements will influence the flow cross-section and thus also the flow resistance. The control of the valve arrangement can then, for example, occur in that the flow resistance cannot fall short of a preselected value. In already existing, controllable valve arrangements such a control can also be implemented subsequently. This can, for example, be done in the software or hardware of an electric control unit by limiting the control signal to the controllable valve or by multiplying the control signal by a constant. Thus, the method can also be used to improve the load independency of known methods or systems, which can influence the position of the raising drive, for example methods of avoiding a bogging down of the tractor, for controlling the slip at the driving wheels, for controlling the penetration depth of tools or for the active oscillation damping during transport.

It is particularly preferred that the calculation of the vertical load and the control of the valve arrangement take place via a control arrangement. Thus, the number of individual components is reduced. A fault susceptible transmission of, for example, the calculated vertical load from a control to the control of a valve arrangement is also avoided.

Preferably, the load signal and/or the calculated vertical load are submitted to a low-pass filtering. As there are usually no heavy requirements with regard to the rapidity of the control, a stable control can be made that simple. Disturbances, if any, will then be removed by the low-pass filtering, without having an undesirable influence on the control.

Preferably, the flow cross-section is calculated depending on the vertical load and a desired lowering speed. The calculation is, for example, made in the control arrangement, which initiates a corresponding movement of the valve element. Thus, a substantially load-independent lowering speed is achieved.

Preferably, the lowering speed can be influenced via a control element. Via such a control element, for example, a driver can use a simple rotary control for changing a proportionality constant in the control of the valve arrangement, thus influencing the lowering speed.

Preferably, the raising process is controlled by a second valve arrangement, which is connected in parallel to the first valve arrangement. Thus, the flow resistance will have no influence during the raising process. During the raising process, the lift cylinder is thus acted upon by the smallest possible flow resistance, independently of the weight of the tool. This may cause that light-weight tools are moved faster upwards than heavy-weight tools. However, this effect is normally desired, as usually the highest possible speed is required for the raising process. However, it is also possible to provide load compensation valves, to achieve a load independent control also during the raising process.

According to the invention, the task is solved by a raising drive as mentioned in the introduction in that the flow resistance depends on a load signal from the load sensor.

The flow resistance is, for example, determined by the available flow cross-section. If, now, the flow cross-section depends on a load signal, a change can be made in that a load independent lowering speed is set. Thus, the lowering speed is determined by the flow cross-section. With a position control, the flow resistance ascertained by means of the load signal determines, for example, the smallest resistance to be permitted during lowering of the raising drive.

It is particularly preferred that the raising drive has a control arrangement, in which the load signal can be converted to a vertical load. A vertical load substantially depends on the weight of the tool. If, now, the load signal can be converted to a vertical load, one of the parameters having the most essential influence on the lowering speed is known. This simplifies the control.

Preferably, a flow cross-section is inversely proportional to the root of the vertical load. This calculation does not require too much from the control device. Thus, a very fast reaction to changes of the vertical load is possible.

Preferably, a first valve arrangement is arranged in the working pipe, the valve arrangement being controllable via the control arrangement. A valve arrangement, for example a valve element with corresponding valve seat, or a throttle or aperture, permits a simple influencing of the flow cross-section and thus also of the flow resistance. The limitation of the opening is a cost effective way of setting the flow resistance.

Preferably, the load sensor is a force sensor. Forces can, for example, be registered by means of strain gauges. Thus, the ruling vertical load can be calculated from the force.

Preferably, the load sensor can measure vertical and horizontal forces. Thus, one single sensor can measure both the drag force and the vertical force caused by the weight of the tool.

In another preferred embodiment, the load sensor is a pressure sensor. This sensor can, for example, be arranged in the working pipe. Thus, the sensor can be mounted in a relatively protected area. This means that the influence from interference factors is relatively small.

Preferably, the raising drive has a second valve arrangement, which is connected in parallel to the first valve arrangement, pressure means flowing through the first valve arrangement during the lowering process 102 and through the second valve arrangement during the raising process 116. Thus, for example in steps 112, 116, different flow resistances can be set for the lowering 102 and raising 116 processes. This means that frequent switching of one single valve is not required.

It is particularly preferred that the second valve arrangement comprises a pressure balance. Thus, also the speed during the raising process can be controlled independently of the weight of the tool.

Preferably, the first valve arrangement and the second valve arrangement are made as a unit. Here, a unit means one component. Such a unit is easy to handle and to mount, and requires relatively little space.

Preferably, the raising drive has a control element for the control arrangement. Via such a control element the driver can, for example, influence that actual lowering or raising speeds.

BRIEF DESCRIPTION OF THE DRAWINGS

In the following, the invention is described on the basis of a preferred embodiment in connection with the drawing, showing.

DETAILED DESCRIPTION

Figure 1:
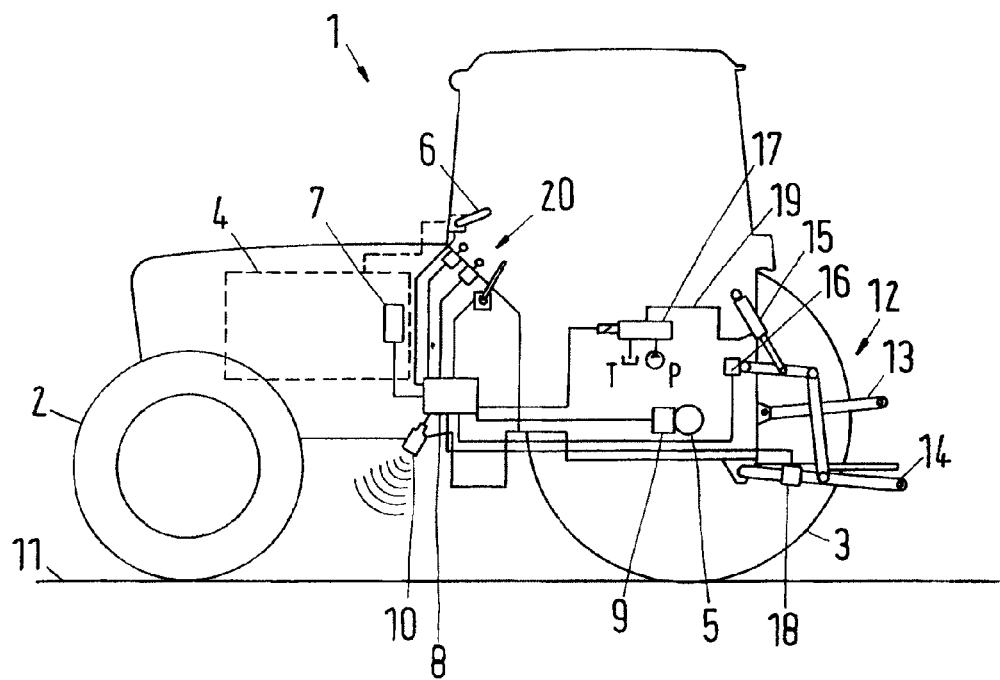
FIG. 1 shows and exemplary tractor with a raising drive.
Figure 2:
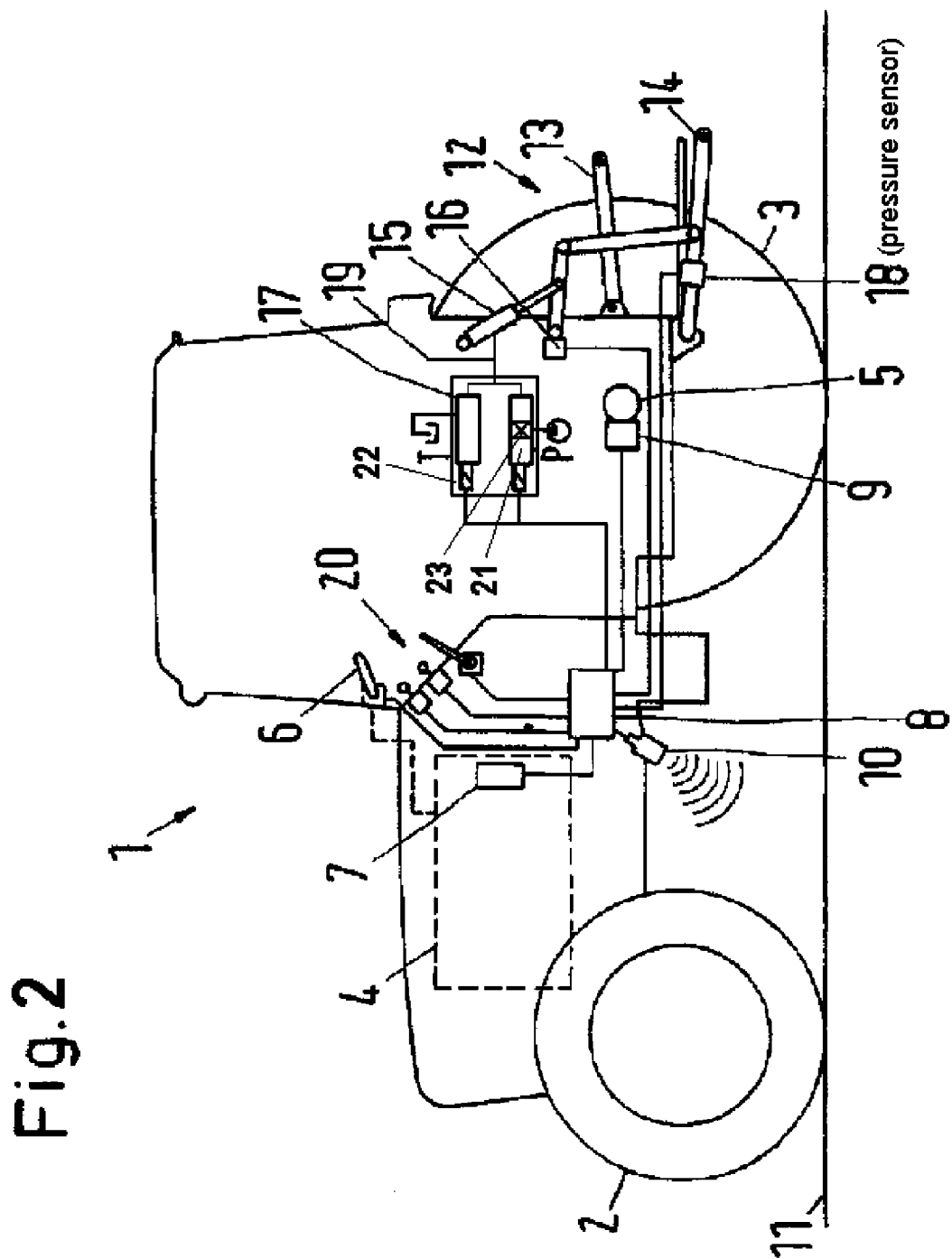
FIG. 2 shows an exemplary tractor with a raising drive having a first and a second valve arrangement.
Figure 3:
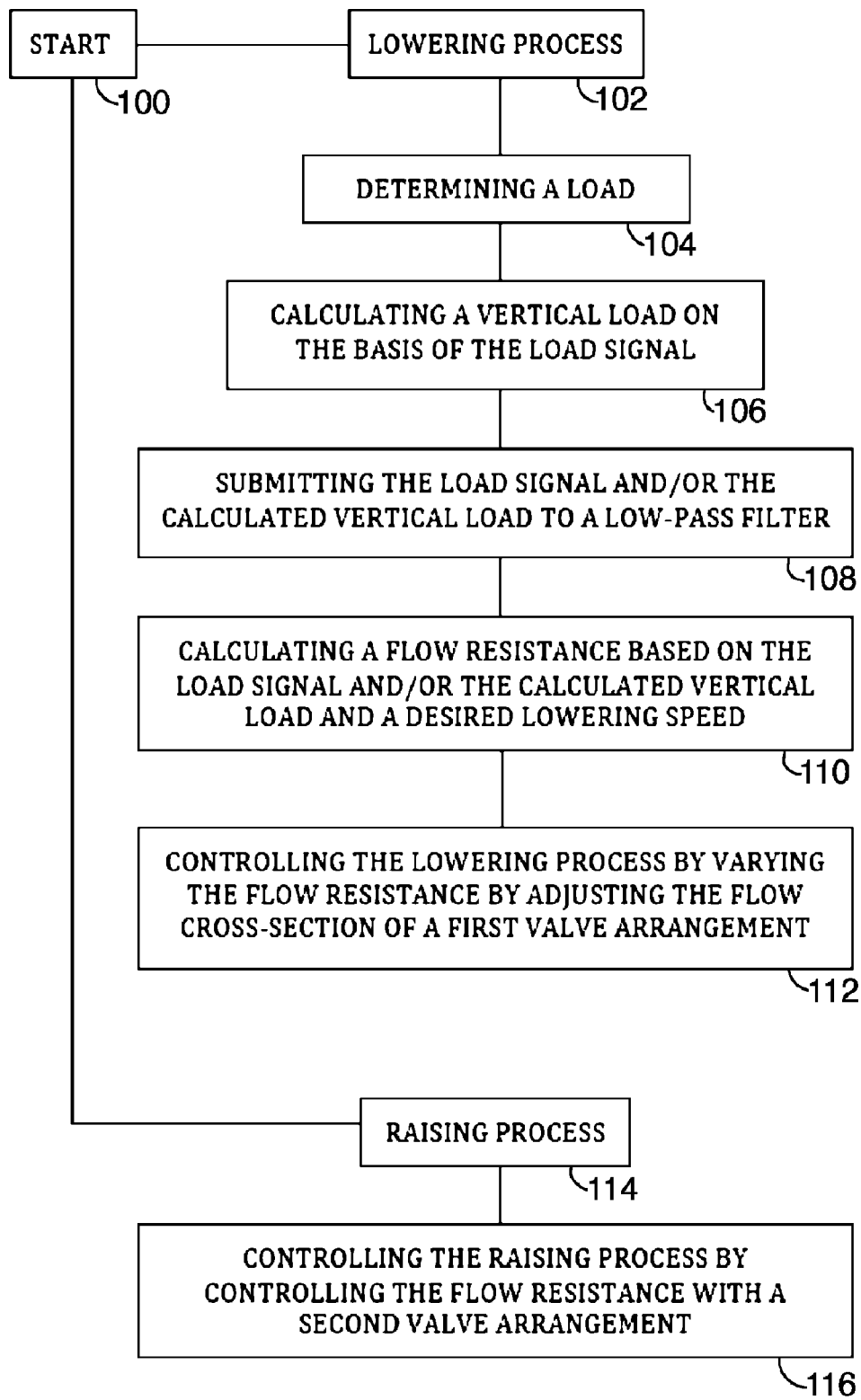
FIG. 3 shows an exemplary method for controlling a lowering process and a raising process.

The only FIGURE shows a tractor 1, comprising a set of non-driven wheels 2 and a set of driven wheels 3. For the driving of the wheels 3, a motor 4 is provided, whose force is transferred to a rear axis 5. Via a lever 6, a driver (not shown) can set a desired speed. Via a sensor 7, the speed of the motor 4 is ascertained and transferred to a control arrangement 8. Further, a sensor 9 is arranged at the rear axis 5, by means of which the number of revolutions of the rear axis 5 is measured. By means of an optical sensor 10, the speed of the tractor 1 in relation to a ground 11 is ascertained. The data is also made available to the control arrangement 8.

A raising drive 12 is arranged at the rear end of the tractor 1. In connection with agricultural vehicles, the raising drive 12 is also often called a tool bar. The raising drive comprises a three-point linkage with an upper handle bar 13 and a lower handle bar 14. By means of a lift cylinder 15 a vertical setting of the raising drive 12 can take place. Various tools, for example a plough, can be attached to the raising drive. The actual vertical position of the raising drive 12 is ascertained by means of a position sensor 16 and made available to the control arrangement 8. The position sensor 16 can, for example, be a potentiometer.

Via a controllable valve arrangement 17, the lift cylinder 15 can optionally be connected to a high-pressure connection P or a low-pressure connection T. In this connection, the valve arrangement 17 is controlled by the control arrangement 8. For raising 116 of the raising drive 12, the lift cylinder 15 is connected to the high-pressure source P, that is, it is pressurised. For the lowering 102, however, the lift cylinder 15 is relieved in that it is connected to the low-pressure side T. This enables utilisation of the effect of the gravity.

A load sensor 18 is arranged at the lower handle bar 14 of the raising drive 12 and is usually only used for measuring the drag forces of a tool. In step 104, the load sensor generates a load signal, which is transferred to the control arrangement 8. In step 106, on the basis of the load signal the control arrangement calculates a vertical load exerted on the raising drive 12 by the tool. This may, for example, take place by means of a subtraction of a calibration constant and subsequent multiplication by a second calibration constant. Thus, in step 108, the calculated vertical load is low-pass filtered, to reduce the influence of brief load changes. The low-pass filtering can, for example, take place by means of a time constant between 3 and 5 seconds.

To ensure that the load sensor 18, which is located at the lower handle bar 14 of the raising drive 12, cannot only generate a signal corresponding to the drag force, but also a signal the corresponds to the vertical load on the raising drive, the load sensor 18 should also be able to measure pressure forces. In this case, it will also emit a load signal when the tool is raised. If the load sensor 18 is neutral point calibrated, a simple algebraic sign scanning is sufficient to ascertain if the signal received from the sensor represents a drag force or a vertical load.

The load signal representing the vertical load can also be obtained from a pressure sensor, which is, for example, arranged in a working pipe 19 connecting the lift cylinder 15 to the valve arrangement.

By means of the load signal, in step 110, the control arrangement 8 calculates a flow resistance, which counteracts pressure means during the lowering process 102, the pressure means flowing from the lift cylinder 15 to the low-pressure connection T. In this connection, in step 112, the flow resistance can be changed by means of the valve arrangement 17, which can release more or less of a flow cross-section. With the forces being equal, a large open flow cross-section means a faster lowering than a small flow cross-section. In connection with a change of the active forces, for example during replacement of the tool, a corresponding adaptation of the flow cross-section can now cause the lowering speed to remain constant. This adaptation occurs automatically by means of the load signal and the control arrangement 8.

A change of the active forces occurs, when the tool hits the ground 11. The vertical load is then substantially reduced. In order to ensure a further lowering of the tool, and thus a penetration into the ground 11, the control arrangement 8 opens the valve arrangement 17 on the basis of the received load signal, so that the lift cylinder is relieved again.

In another embodiment, the permissible flow cross-section, which limits the lowering speed, will be calculated according to the so-called aperture formula. In this connection, the largest possible flow cross-section is prespecified by the spatial conditions, for example the cross-section of the working pipe.

For valves with linear characteristic, a constant pressure means flow is achieved such that the deflection of the valve is inversely proportional to the square root of the pressure difference across the valve.

The pressure in the working pipe 19 between the valve arrangement 17 and the raising cylinder 15 is substantially proportional to the vertical load. As the outlet of the valve arrangement 17 is connected to the low-pressure connection T, which is usually pressure-less. Additionally, the pressure drop across the valve arrangement is proportional to the vertical load.

A constant pressure means flow and thus a load-independent lowering speed can thus be achieved in that the valve deflection occurs inversely proportional to the root of the vertical load.

In this embodiment, a reduction of the lowering speed set by an operator via the control element 20 can be cancelled when the working tool hits the ground, such that the valve arrangement is completely opened. Thus, the complete weight of the working tool can be used for the penetration into the ground. If the contact with the ground is disturbed, which may, for example, happen in connection with driving across rough ground, then the lowering of the raising drive will be substantially faster than prespecified by the operator.

If, in cases of doubt, for example in connection with the activation of the control arrangement, a high vertical load is always assumed, that is, with a conservative dimensioning of the control, there are no high demands with regard to the speed of the control. Thus, it is relatively easy to achieve a stable control. In order to eliminate possible interferences, a low-pass filtering of the load signals and/or the calculated vertical load can be made.

The use of a low-pass filtering can provoke a delayed reaction of the control to new conditions. This effect can, for example, be reduced by implementing a minimum vertical load. The minimum vertical load is chosen in consideration of the operating feeling, and can, for example, amount to 3%, 5% or 7% of the nominal load. With a raising drive having a nominal load of 10 tons, this corresponds to 300 kg, 500 kg or 700 kg. Thus, the maximum adjustable flow cross-section is fixed by the minimum vertical load.

The valve arrangement 17 can be an electrically controllable valve. In this connection, the valve arrangement can have a load-independent control of the raising speed. Such a valve arrangement is, for example, known from U.S. Pat. No. 6,971,407 B2.

The method according to the invention can be used in existing systems by retrofitting a corresponding controllable valve arrangement 17. This valve arrangement can comprise a valve with an adjustable bleed and a non-return valve connected in parallel to said valve, this valve arrangement being arranged between an existing control valve and the raising drive. The pressure activation of the raising cylinder for raising the raising drive then occurs via the non-return valve. Thus, it is ensured that a limitation of the flow cross-section through the valve arrangement only occurs during the lowering process. The control of the valve arrangement then occurs through an additional control unit, which is connected to a suitable load sensor.

In many cases, it is desirable that the operator is able to influence the lowering or raising speed of the raising drive 12. For this purpose, a control element 20 may be provided, which has, for example, a simple rotary regulator influencing a proportionality constant in the control of the valve deflection.

The control arrangement 8 monitors and controls the position of the raising drive 12 in consideration of the signals from the position sensor 16. Further to the specifications of the driver, this position control can also consider signals of the optical sensors 10 or the speed sensor 9. Frequently, this will require an adjustment of the position of the raising drive 12, that is, a lowering or raising.

During the lowering, the control arrangement 8 ensures a control of the valve arrangement 17 in such a manner that a substantially load-independent lowering speed is ensured. For example, in this connection, the valve deflection, which is proportional to the flow cross-section, can be calculated in accordance with the following formula:

$$D = C \times V / \sqrt{(W/W_0)},$$

D being the valve deflection, C being a constant, V being the actual desired speed, W being the vertical load and $W_0$ being the minimum vertical load.

If the vertical load is smaller than minimum vertical load, the calculation of the valve deflection takes place according to the following formula:

$$D = C \times V.$$

If the valve has a non-linear characteristic, the formulas have to be adapted accordingly.

In order to ensure that a pressure means flow can be possible in connection with a reduction of the flow cross-section, the valve arrangement 17 can be provided with a so-called dead-band compensation. The dead-band compensation ensures that the valve arrangement 17 only closes completely, if a specific control signal is sent or not sent. Such a signal can, for example, be derived from the operation mode of the raising drive selected by the operator via additional control elements.

With regard to this embodiment, the invention has been explained by means of a tractor. However, it can also be used with other vehicles or differently designed raising drives, which have, for example, several raising cylinders. Also the location of the raising drive at the rear end of the vehicle must only be understood as an example.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A method for controlling a raising drive, comprising:
   pressurizing at least one lift cylinder for a raising process and relieving the pressure in the at least one lift cylinder for a lowering process; and
   controlling a lowering speed by means of a variable flow resistance;
   wherein the flow resistance is determined depending on at least one load signal;
   wherein a vertical load is calculated on the basis of the load signal; and
   wherein an increase of the vertical load will increase the flow resistance, and a reduction of the vertical load will reduce the flow resistance.

2. The method according to claim 1, wherein the load signal is generated by a force sensor, which ascertains a drag force.

3. The method according to claim 1, wherein the flow resistance is changed by a first valve arrangement.

4. The method according to claim 3, wherein the calculation of the vertical load and the control of the first valve arrangement take place via a control arrangement.

5. The method according to claim 3, wherein the flow resistance is controlled by adjusting a flow cross-section of the first valve arrangement, which is calculated depending on the vertical load and a desired lowering speed.

6. The method according to claim 1, wherein the lowering speed is influenced via a control element.

7. The method according to claim 1, wherein the load signal and/or the calculated vertical load are submitted to a low-pass filtering.

8. The method according to claim 3, wherein the raising process is controlled by a second valve arrangement.

9. A method for controlling a raising drive, comprising:
   pressurizing at least one lift cylinder for a raising process and relieving the pressure in the at least one lift cylinder for a lowering process; and controlling a lowering speed by means of a variable flow resistance;

wherein the flow resistance is determined depending on at least one load signal;

wherein a vertical load is calculated on the basis of the load signal; and wherein the load signal is generated by a force sensor, which ascertains a drag force.

10. The method according to claim 9, wherein the flow resistance is changed by a first valve arrangement.

11. The method according to claim 10, wherein the calculation of the vertical load and the control of the first valve arrangement take place via a control arrangement.

12. The method according to claim 10, wherein the flow resistance is controlled by adjusting a flow cross-section of the first valve arrangement, which is calculated depending on the vertical load and a desired lowering speed.

13. The method according to claim 10, wherein the raising process is controlled by a second valve arrangement.

14. The method according to claim 9, wherein the load signal and/or the calculated vertical load are submitted to a low-pass filtering.

15. The method according to claim 9, wherein the lowering speed is influenced via a control element.

16. A method for controlling a raising drive, comprising:
pressurizing at least one lift cylinder for a raising process and relieving the pressure in the at least one lift cylinder for a lowering process; and
controlling a lowering speed by means of a variable flow resistance;
wherein the flow resistance is determined depending on at least one load signal;
wherein a vertical load is calculated on the basis of the load signal;
wherein the flow resistance is changed by a first valve arrangement; and
wherein the flow resistance is controlled by adjusting a flow cross-section of the first valve arrangement, which is calculated depending on the vertical load and a desired lowering speed.

17. The method according to claim 16, wherein the calculation of the vertical load and the control of the first valve arrangement take place via a control arrangement.

18. The method according to claim 16, wherein the load signal and/or the calculated vertical load are submitted to a low-pass filtering.

19. The method according to claim 16, wherein the lowering speed is influenced via a control element.

20. The method according to claim 16, wherein the raising process is controlled by a second valve arrangement.

21. A raising drive having at least one single-actuated hydraulic cylinder, which is connected to a working pipe, a flow resistance of the working pipe being variable, and the raising drive having at least one load sensor, wherein the flow resistance depends on a load signal from the load sensor, wherein the raising drive has a control arrangement, in which the load signal is converted to a vertical load, wherein a flow cross-section of the working pipe is inversely proportional to the root of the vertical load.

22. The raising drive according to claim 21, wherein a first valve arrangement is arranged in the working pipe, the valve arrangement being controllable via the control arrangement.

23. The raising drive according to claim 22, wherein the raising drive has a second valve arrangement, pressure fluid flowing through the first valve arrangement during the lowering process and through the second valve arrangement during the raising process.

24. The raising drive according to claim 23, wherein the second valve arrangement comprises a pressure balance.

25. The raising drive according to claim 23, wherein the first valve arrangement and the second valve arrangement are made as a unit.

26. The raising drive according to claim 21, wherein the load sensor is a force sensor.

27. The raising drive according to claim 21, wherein the load sensor is a pressure sensor.

28. The raising drive according to claim 21, wherein the raising drive has a control element for the control arrangement.

29. A raising drive having at least one single-actuated hydraulic cylinder, which is connected to a working pipe, a flow resistance of the working pipe being variable, and the raising drive having at least one load sensor, wherein the flow resistance depends on a load signal from the load sensor, wherein the raising drive has a control arrangement, in which the load signal is converted to a vertical load, wherein the load sensor measures vertical and horizontal forces.

30. The raising drive according to claim 29, wherein the flow resistance is controlled by adjusting a flow cross-section of the working pipe, which is inversely proportional to the root of the vertical load.

31. The raising drive according to claim 29, wherein a first valve arrangement is arranged in the working pipe, the valve arrangement being controllable via the control arrangement.

32. The raising drive according to claim 31, wherein the raising drive has a second valve arrangement, pressure fluid flowing through the first valve arrangement during the lowering process and through the second valve arrangement during the raising process.

33. The raising drive according to claim 32, wherein the second valve arrangement comprises a pressure balance.

34. The raising drive according to claim 32, wherein the first valve arrangement and the second valve arrangement are made as a unit.

35. The raising drive according to claim 29, wherein the load sensor is a force sensor.

36. The raising drive according to claim 29, wherein the load sensor measures vertical and horizontal forces.

37. The raising drive according to claim 29, wherein the load sensor is a pressure sensor.

38. The raising drive according to claim 29, wherein the raising drive has a control element for the control arrangement.

* * * * *